(12) United States Patent
Varadarajan et al.

(10) Patent No.: US 7,552,865 B2
(45) Date of Patent: Jun. 30, 2009

(54) SYSTEM AND METHOD FOR DEEP INTERACTION MODELING FOR FRAUD DETECTION

(75) Inventors: Sridhar Varadarajan, Bangalore (IN); Korrapati Kalyana Rao, Bangalore (IN); Sridhar Gangadharpalli, Bangalore (IN)

(73) Assignee: Satyam Computer Services Ltd., Bangalore (IN)

( * ) Notice: Subject to any disclaimer, the term of this patent is extended or adjusted under 35 U.S.C. 154(b) by 796 days.

(21) Appl. No.: 11/254,517

(22) Filed: Oct. 20, 2005

(65) Prior Publication Data

US 2007/0090181 A1    Apr. 26, 2007

(51) Int. Cl.
*G06F 19/00* (2006.01)
(52) U.S. Cl. .................. 235/379; 235/380; 235/441
(58) Field of Classification Search ................ 235/379, 235/380, 381, 441; 705/35, 39, 40, 43, 44
See application file for complete search history.

(56) References Cited

U.S. PATENT DOCUMENTS 5,311,594 A * 5/1994 Penzias ............... 713/183
5,819,226 A 10/1998 Gopinathan et al.
5,884,289 A 3/1999 Anderson et al.
6,516,056 B1 2/2003 Justice et al.
6,736,313 B1 5/2004 Dickson
RE38,572 E 8/2004 Tetro et al.
6,817,520 B2 * 11/2004 Kroll ...................... 235/380
7,246,740 B2 * 7/2007 Swift et al. ............. 235/379
2004/0155960 A1 * 8/2004 Wren et al. ............. 348/150

* cited by examiner

*Primary Examiner*—Daniel A Hess
(74) *Attorney, Agent, or Firm*—The Webb Law Firm

(57) ABSTRACT

The use of a variety of plastic cards to carry out monetary transactions is on the increase. It is important to ensure that such transactions are authenticated, authorized, and accounted in a best possible manner to prevent fraudulent transactions. However, as much the transactions are being protected, the fraudsters are becoming that much more cleverer and are being able to break into the system. One of the important requirements is to protect transactions of cash cards as these cards seem to be an easier target for fraudsters. A system for cash card fraud detection involves ensuring that a cash card user's unique "signature" is determined and kept track of during the course of the use of the cash card.

24 Claims, 18 Drawing Sheets

MULTIPLE FRAUDNESS DETECTORS AND FRAUD ASSESSMENT

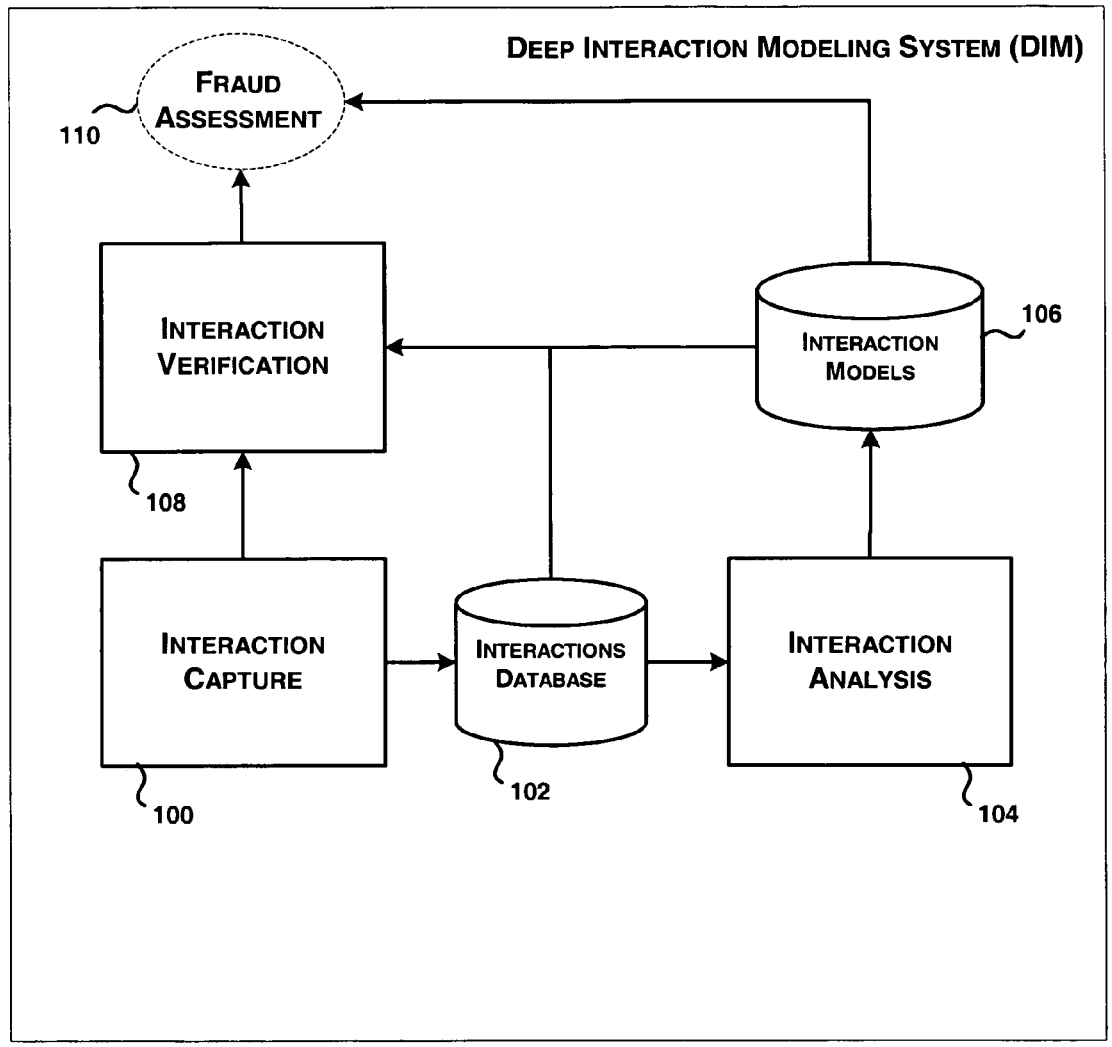
FIG. 1: SYSTEM ARCHITECTURE OF DIM SYSTEM

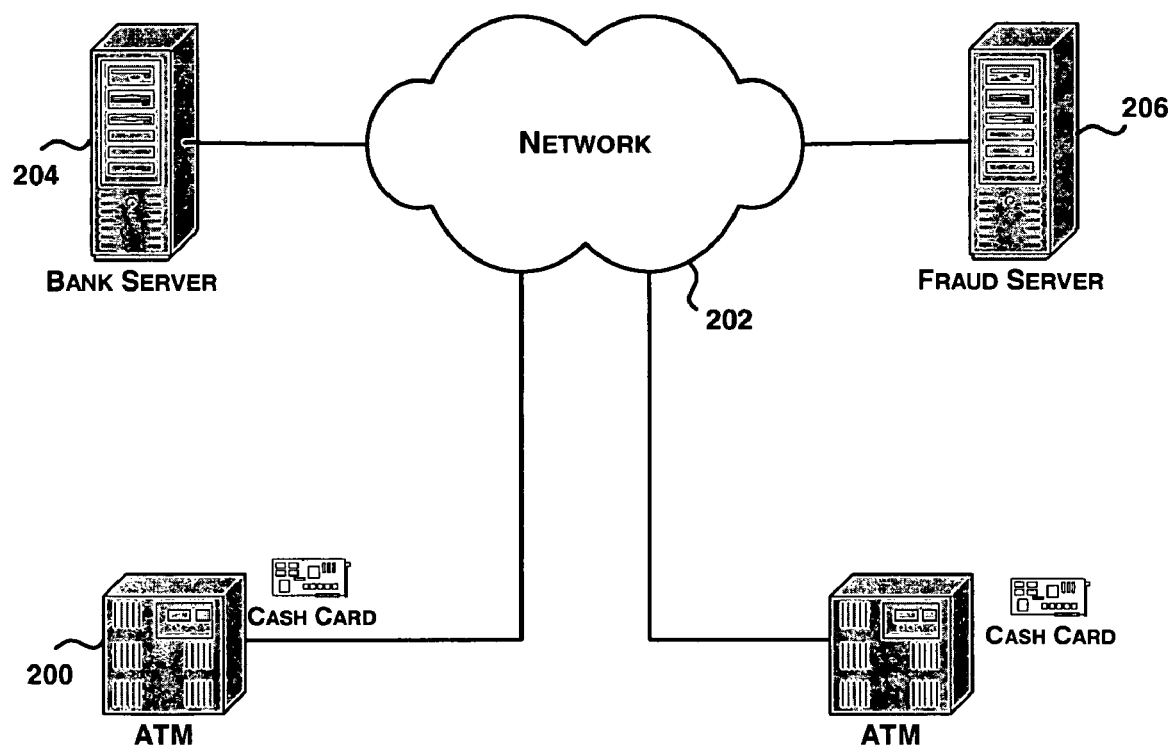
FIG. 2: NETWORK ARCHITECTURE OF DIM SYSTEM

FORMATS AND DATABASES

CARD SWIPE INFO — 300

| CUST ID | TIMESTAMP | FALSE RESTARTS | SWIPE RATE | RESWIPES |
|---|---|---|---|---|

CARD INSERTION INFO — 302

| CUST ID | TIMESTAMP | # OF KEYSTROKES BEFORE INSERTION | FALSE RESTARTS | # OF KEYSTROKES AFTER INSERTION |
|---|---|---|---|---|

PIN INSERTION INFO — 304

| CUST ID | TIMESTAMP | FALSE RESTARTS | # OF KEYSTROKES BEFORE DIG 1 OF PIN | # OF KEYSTROKES BEFORE DIG 2 OF PIN |
|---|---|---|---|---|
| | | # OF KEYSTROKES BEFORE DIG 3 OF PIN | # OF KEYSTROKES BEFORE DIG 4 OF PIN | # OF KEYSTROKES AFTER DIG 4 OF PIN |

SCREEN ENTRY INFO — 306

| CUST ID | TIMESTAMP | SCREEN ID | # OF KEYSTROKES BEFORE INSERTION | FIELDS ORDER VALUE |
|---|---|---|---|---|
| | | AVG. INTER-FIELD INTERVAL | | |

WF NAVIGATION INFO — 308

| CUST ID | TIMESTAMP | SCREEN 1 ORDER VALUE | SCREEN 2 ORDER VALUE | SCREEN N ORDER VALUE | AVG. INTER-SCREEN INTERVAL |
|---|---|---|---|---|---|

WAMOUNT INFO — 310

| CUST ID | TIMESTAMP | # OF KEYSTROKES BEFORE PROVIDING AMOUNT INFO | AMOUNT | DENOMI-NATION 1 | DENOMI-NATION 1 | DENOMI-NATION N |
|---|---|---|---|---|---|---|
| | | | | | | # OF KEYSTROKES AFTER PROVIDING AMOUNT INFO |

MULTI-CARD USAGE INFO — 312

| CUST ID | TIME STAMPS | CARD ID | AMOUNT | HOUR | DAY |
|---|---|---|---|---|---|

CARD INFO — 314

| CUST ID | # OF CARDS | LIST OF CARD IDS | ADDITIONAL INFO |
|---|---|---|---|

FRAUD ASSESSMENT INFO — 316

| CUST ID | CSMF | CIMF | PIMF | SEMF | WNMF | WAMF | MCUMF | FRAUD SCORE |
|---|---|---|---|---|---|---|---|---|

MODEL TRAINING DATA — 318

| CUST ID | MODEL ID | MODEL TRAINING DATA |
|---|---|---|

MODEL INFO — 320

| CUST ID | MODEL ID | MODEL DESCRIPTION | MODEL WEIGHTS |
|---|---|---|---|

FIG. 3: DESCRIPTION OF DATABASES

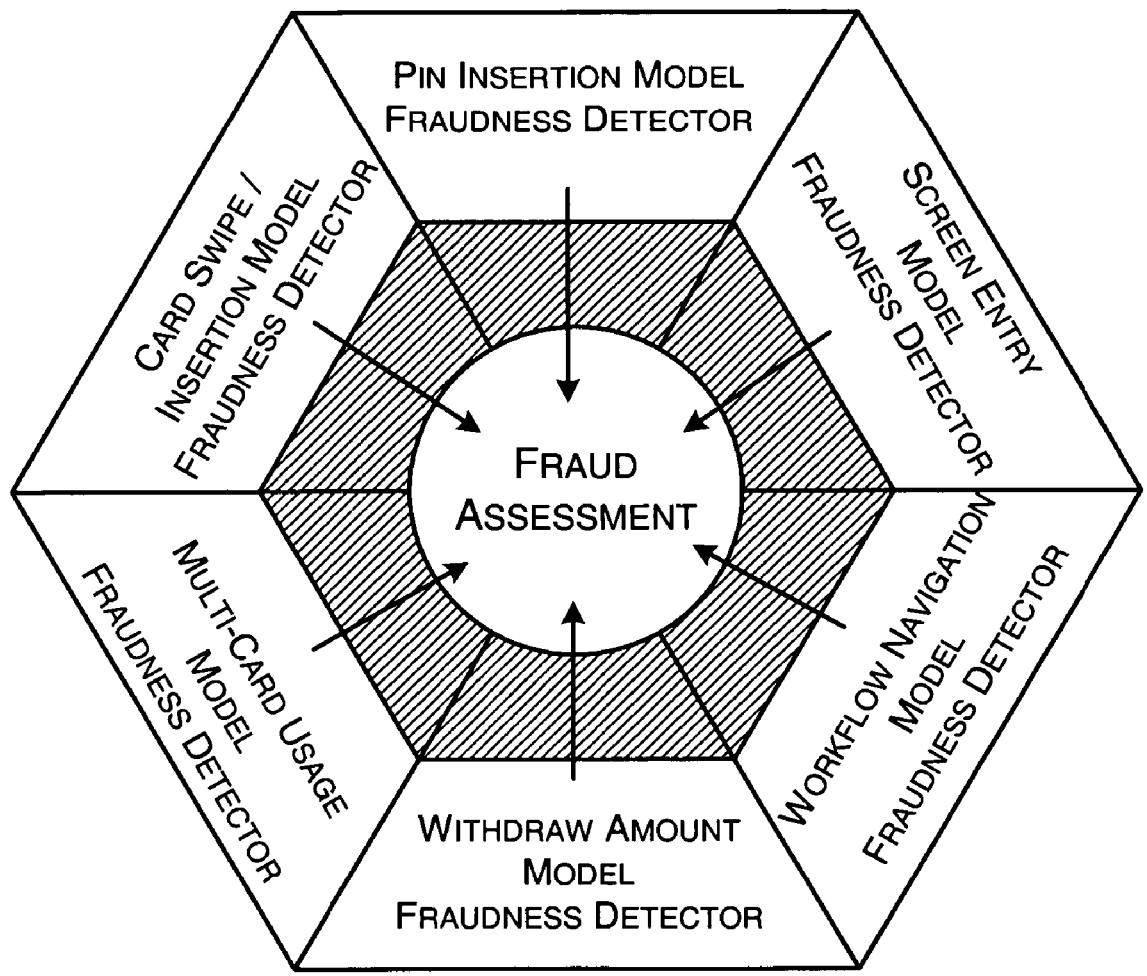
FIG. 4: MULTIPLE FRAUDNESS DETECTORS AND FRAUD ASSESSMENT

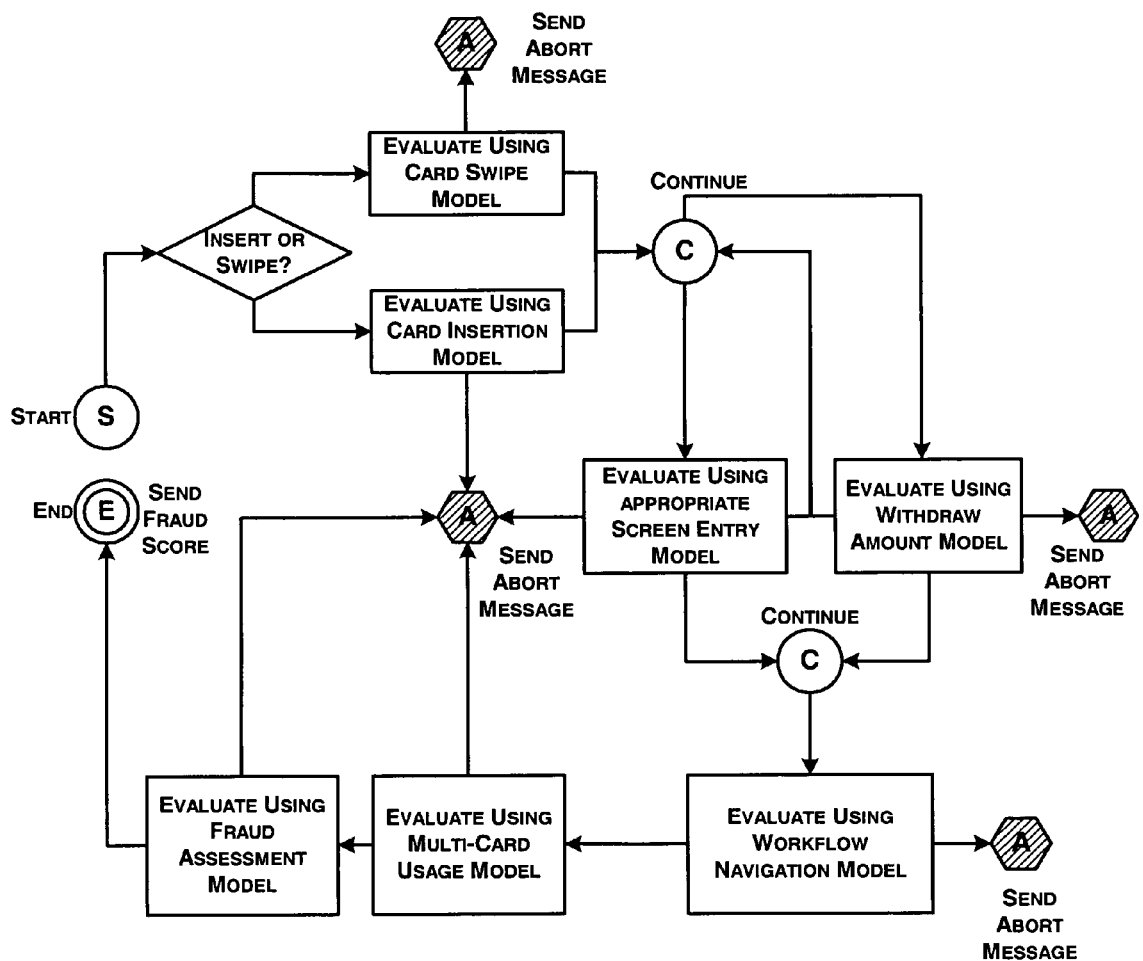
FIG. 5: FRAUD DETECTION FLOW

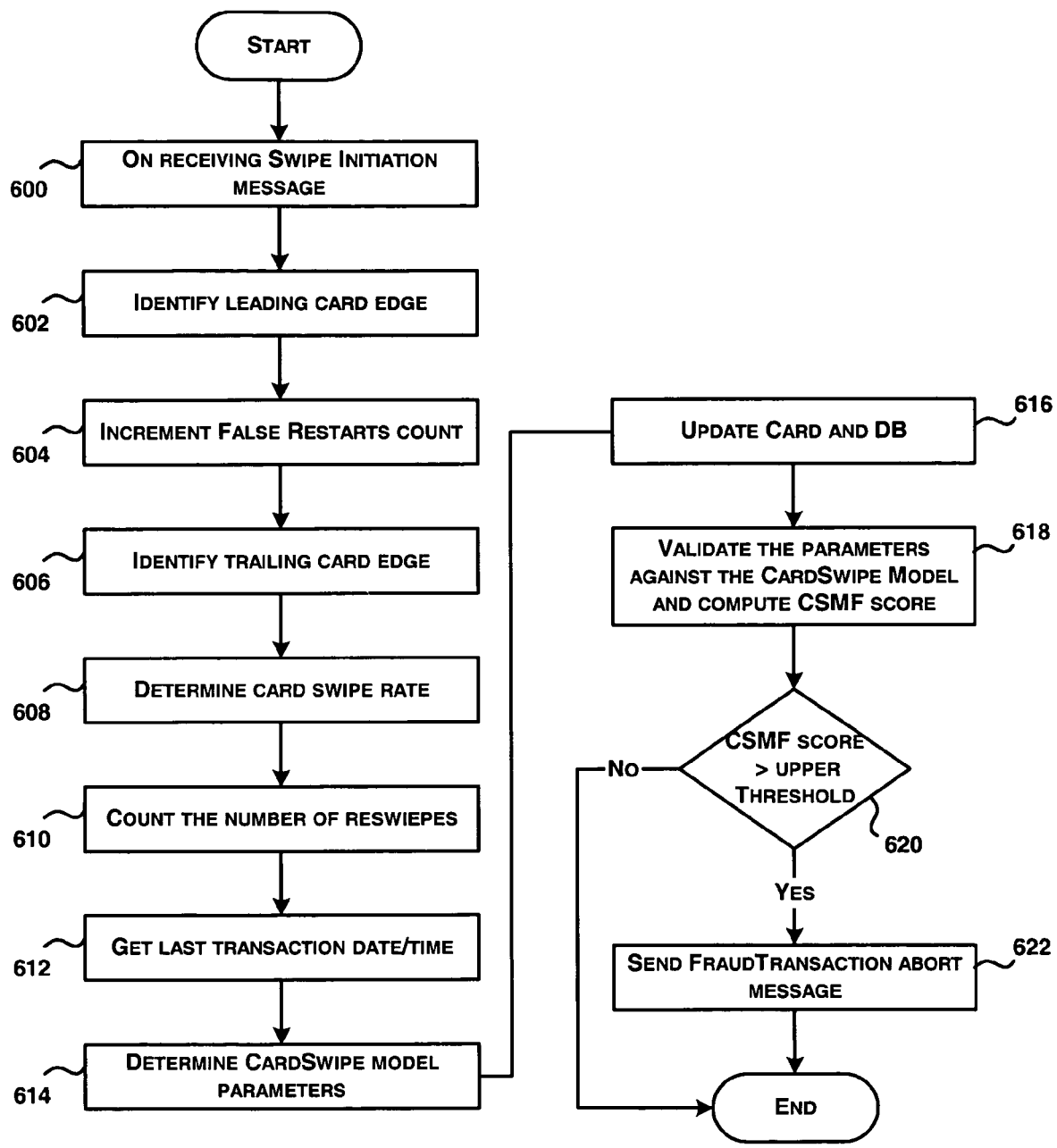
FIG. 6: CARD SWIPE MODEL BASED FRAUDNESS DETECTION

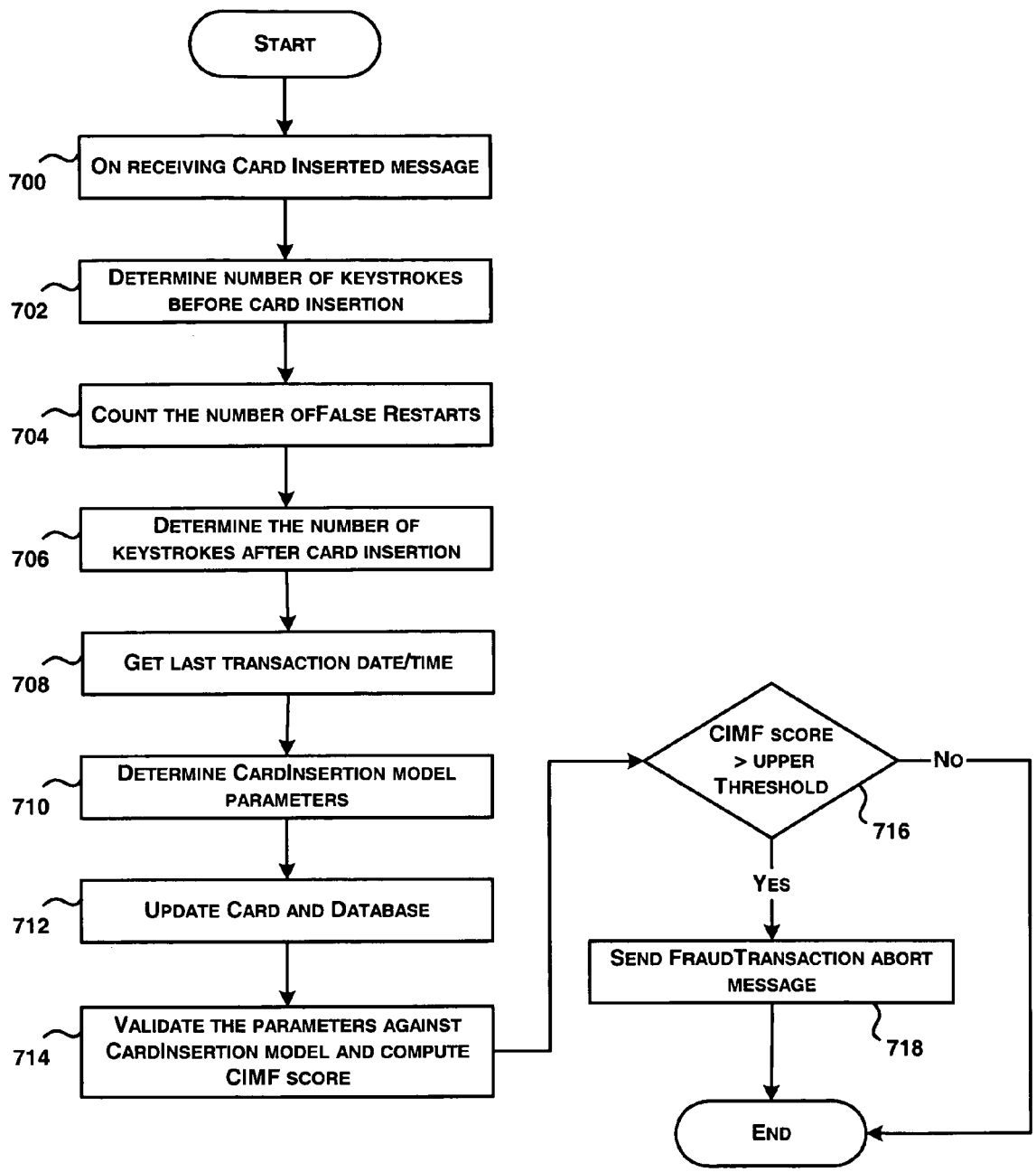
FIG. 7: CARD INSERTION MODEL BASED FRAUDNESS DETECTION

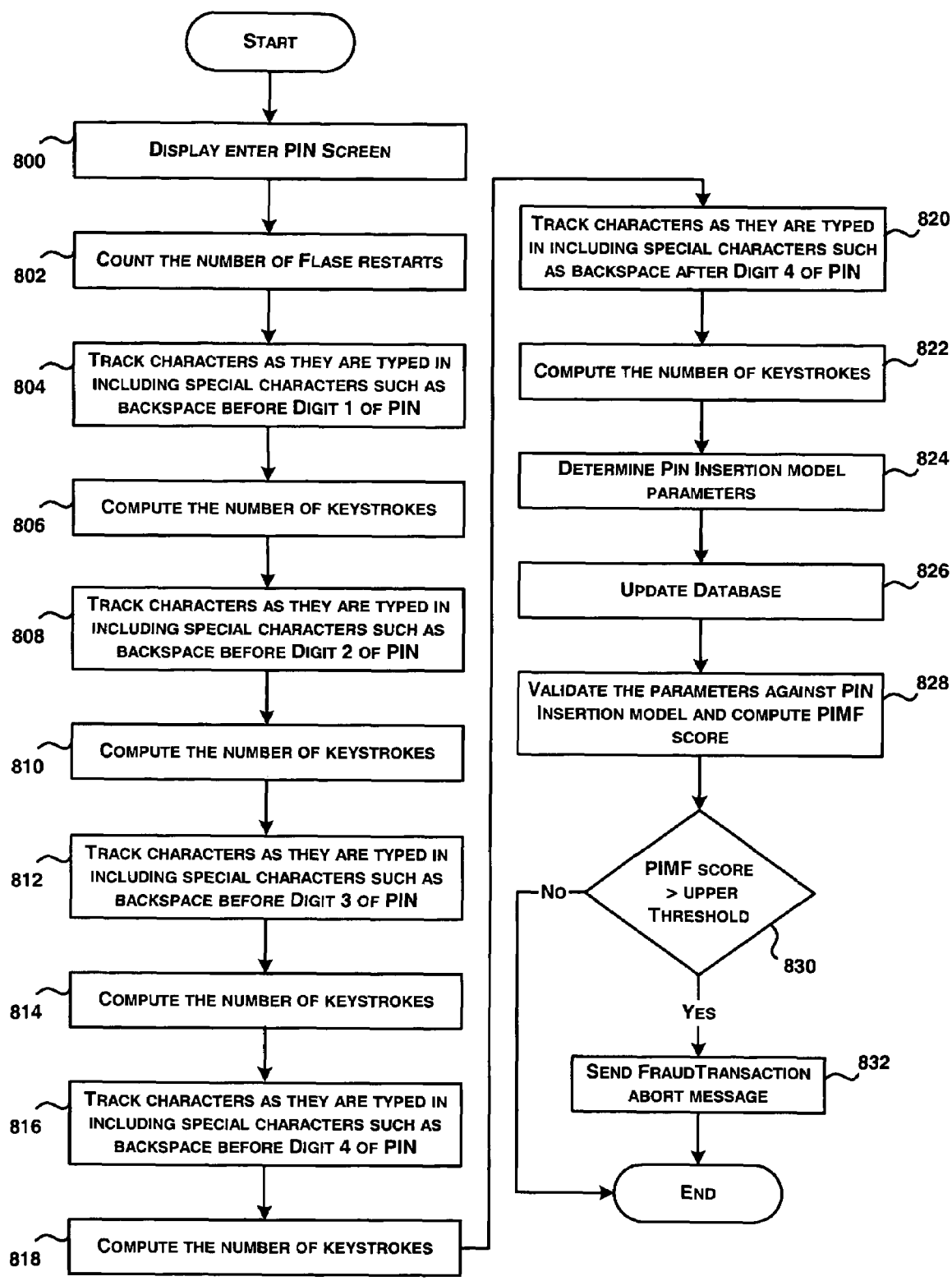
FIG. 8: PIN INSERTION MODEL BASED FRAUDNESS DETECTION

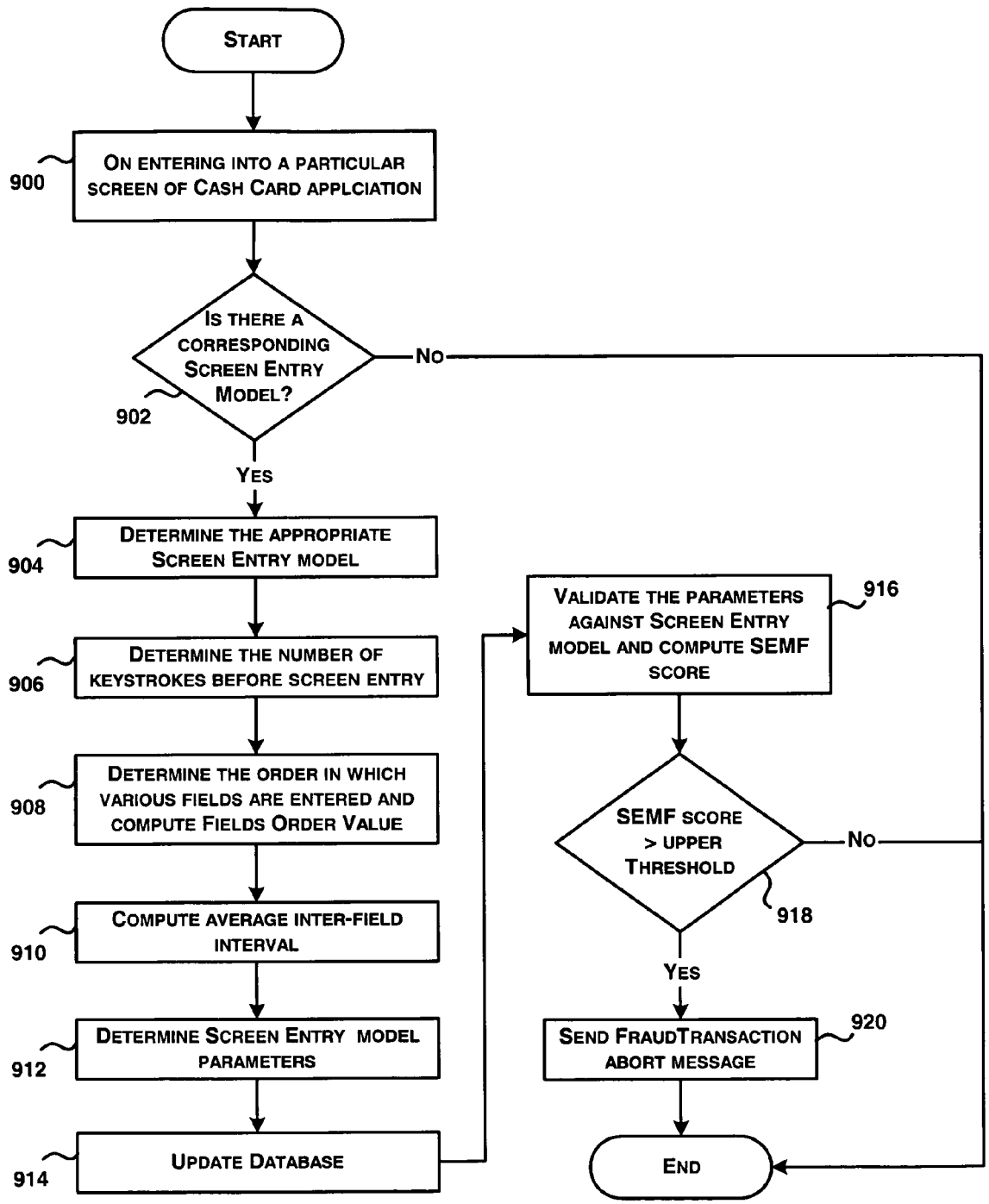
FIG. 9: SCREEN ENTRY MODEL BASED FRAUDNESS DETECTION

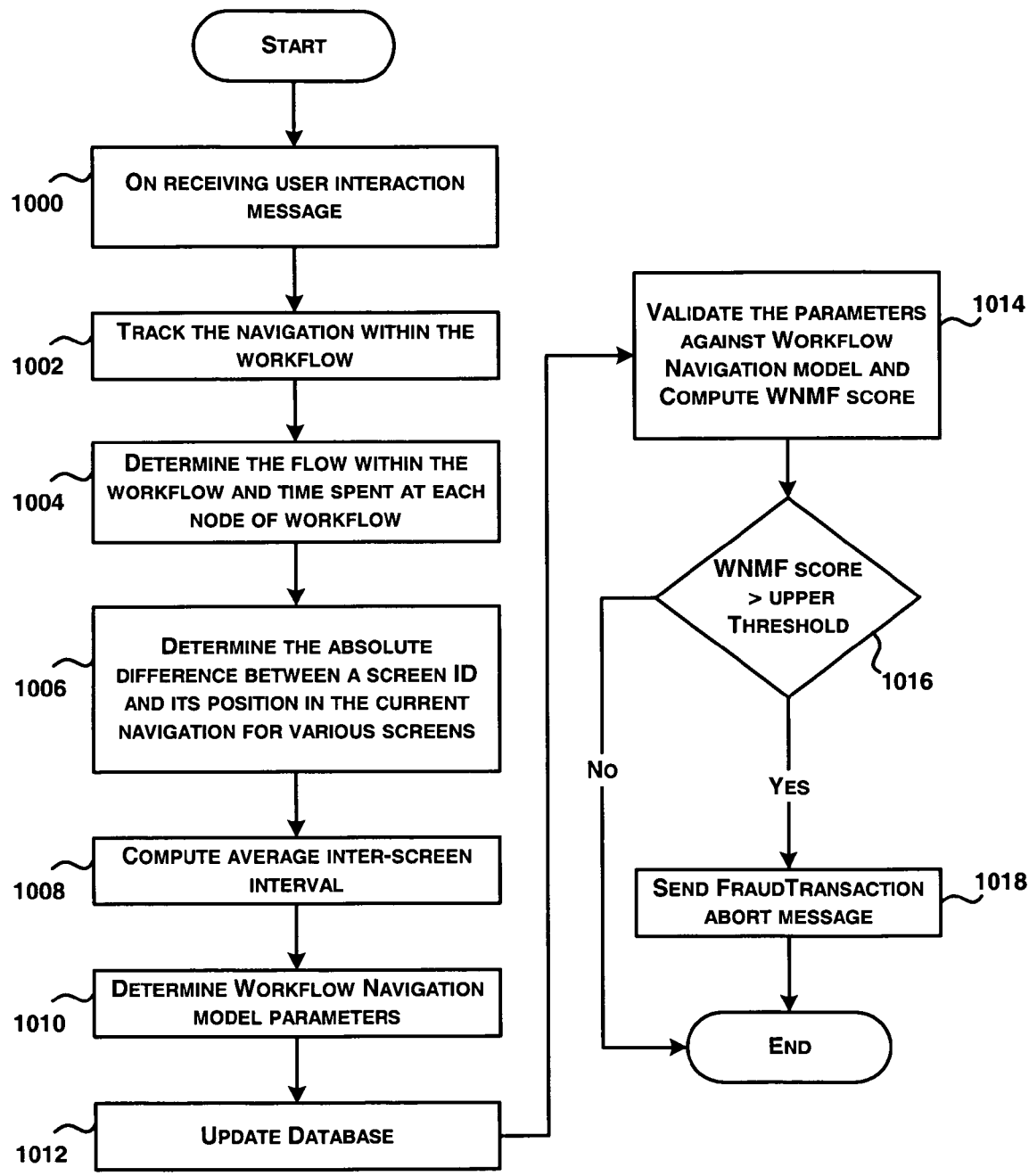
FIG. 10: WORKFLOW NAVIGATION MODEL BASED FRAUDNESS DETECTION

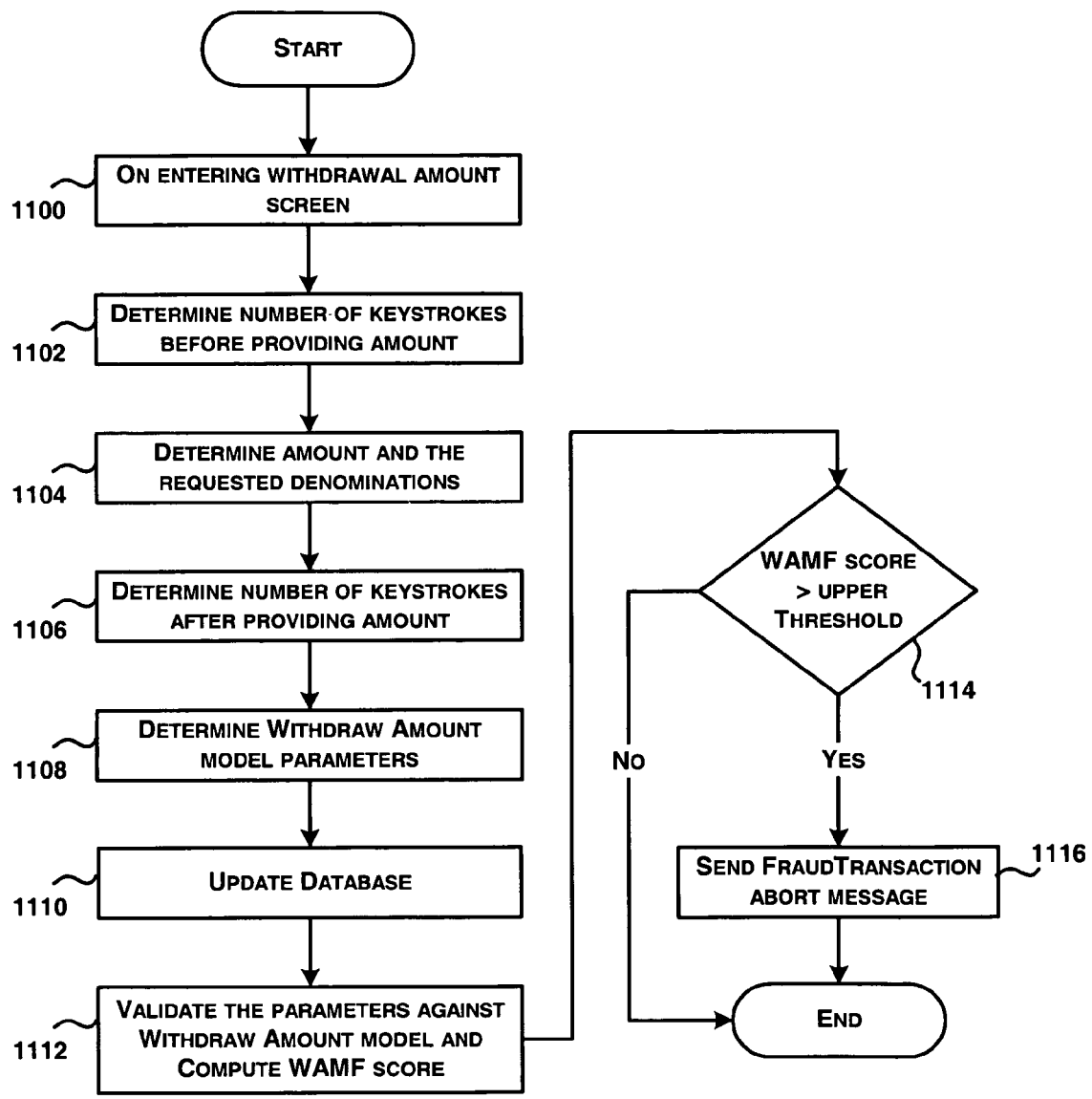
FIG. 11: WITHDRAW AMOUNT MODEL BASED FRAUDNESS DETECTION

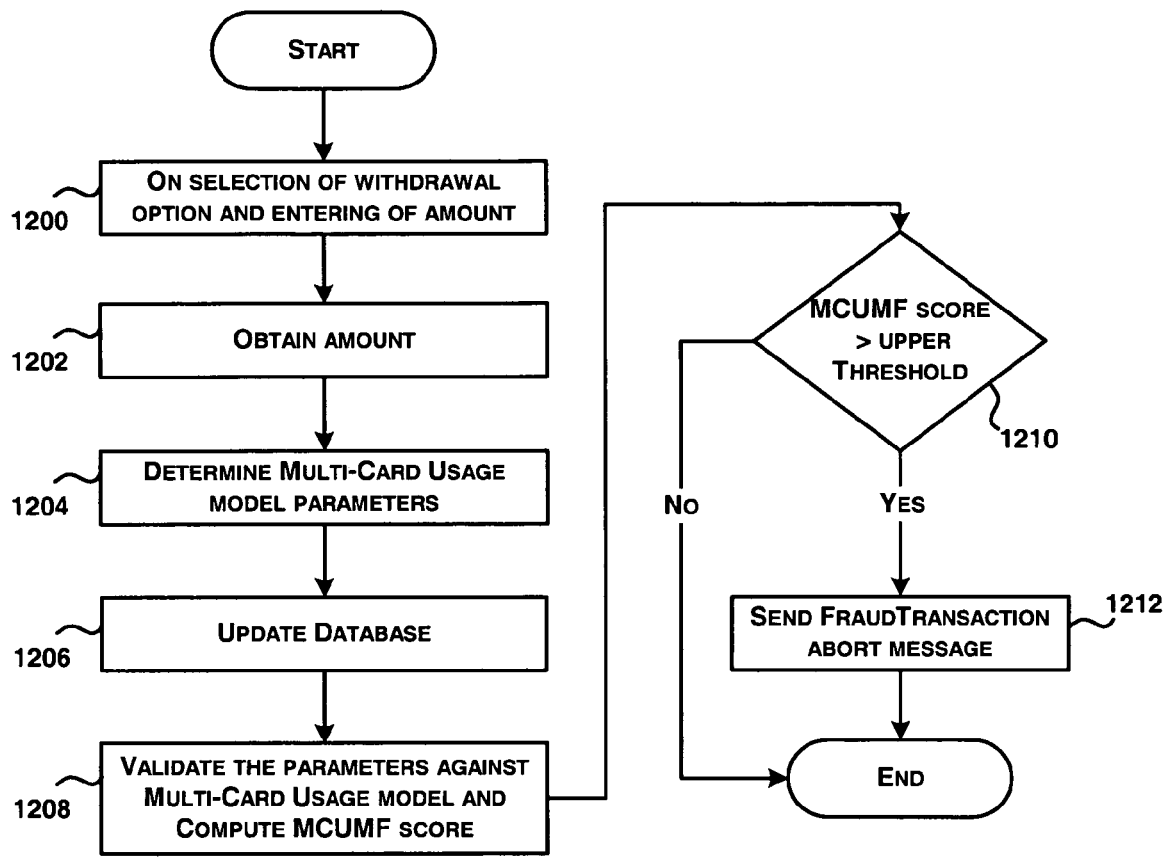
FIG. 12: MULTI-CARD USAGE MODEL BASED FRAUDNESS DETECTION

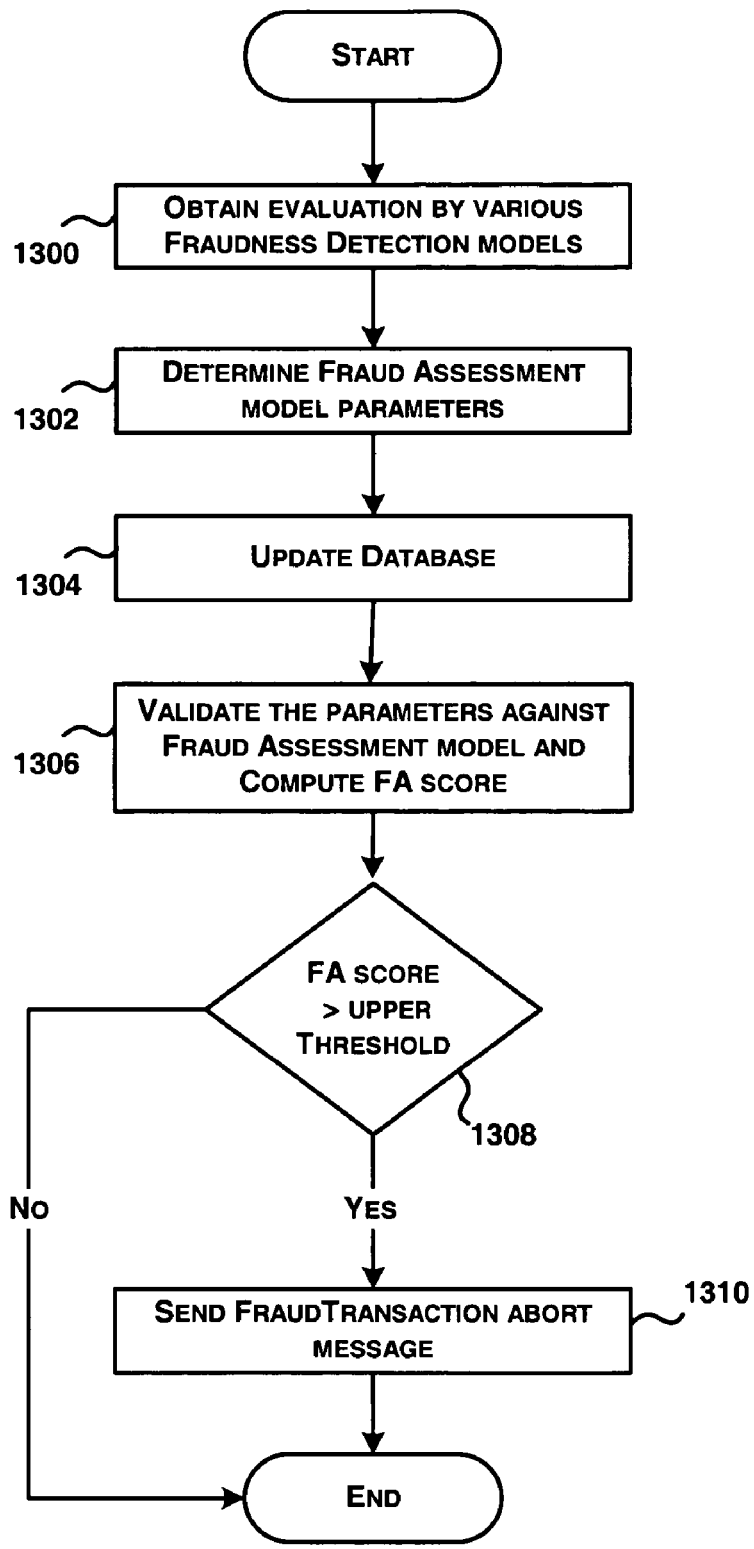
FIG. 13: FRAUD ASSESSMENT

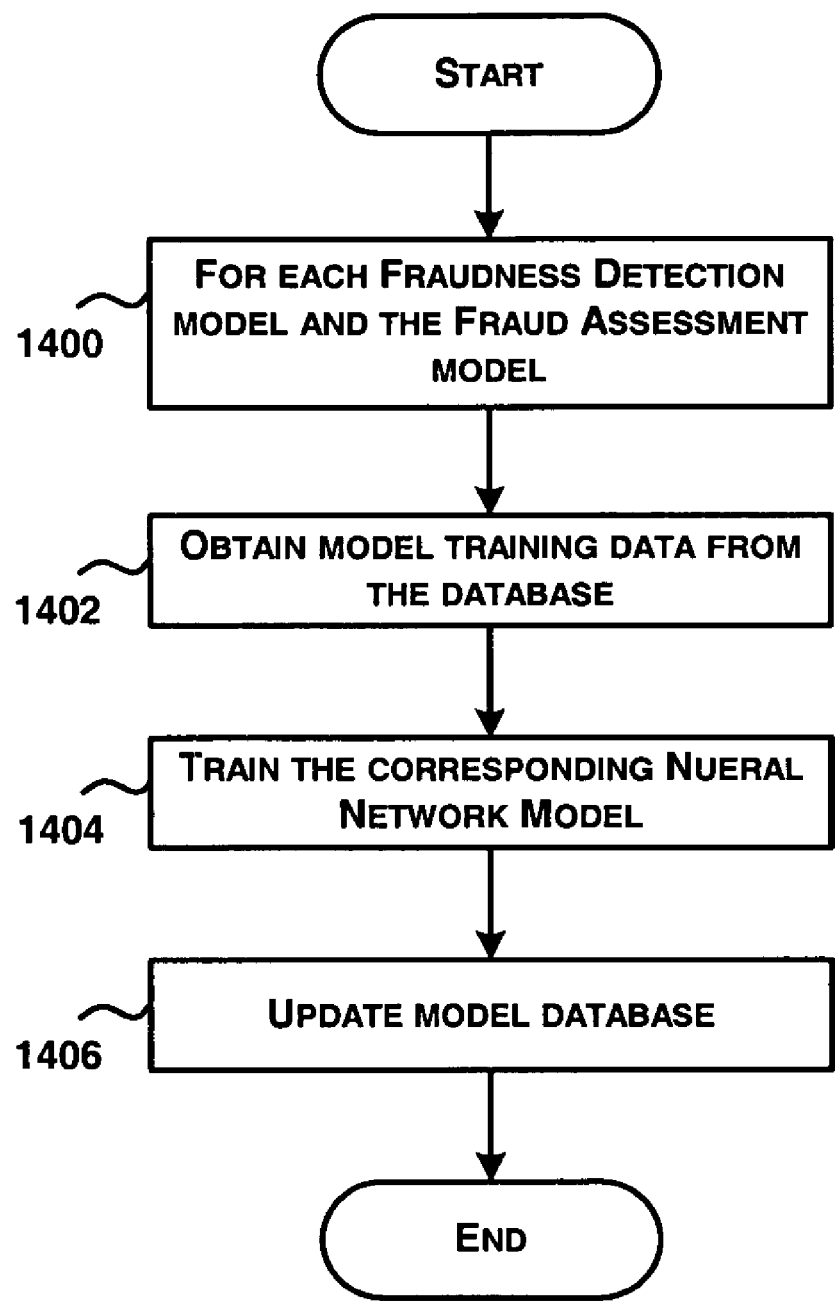
FIG. 14: GENERATION OF MODELS

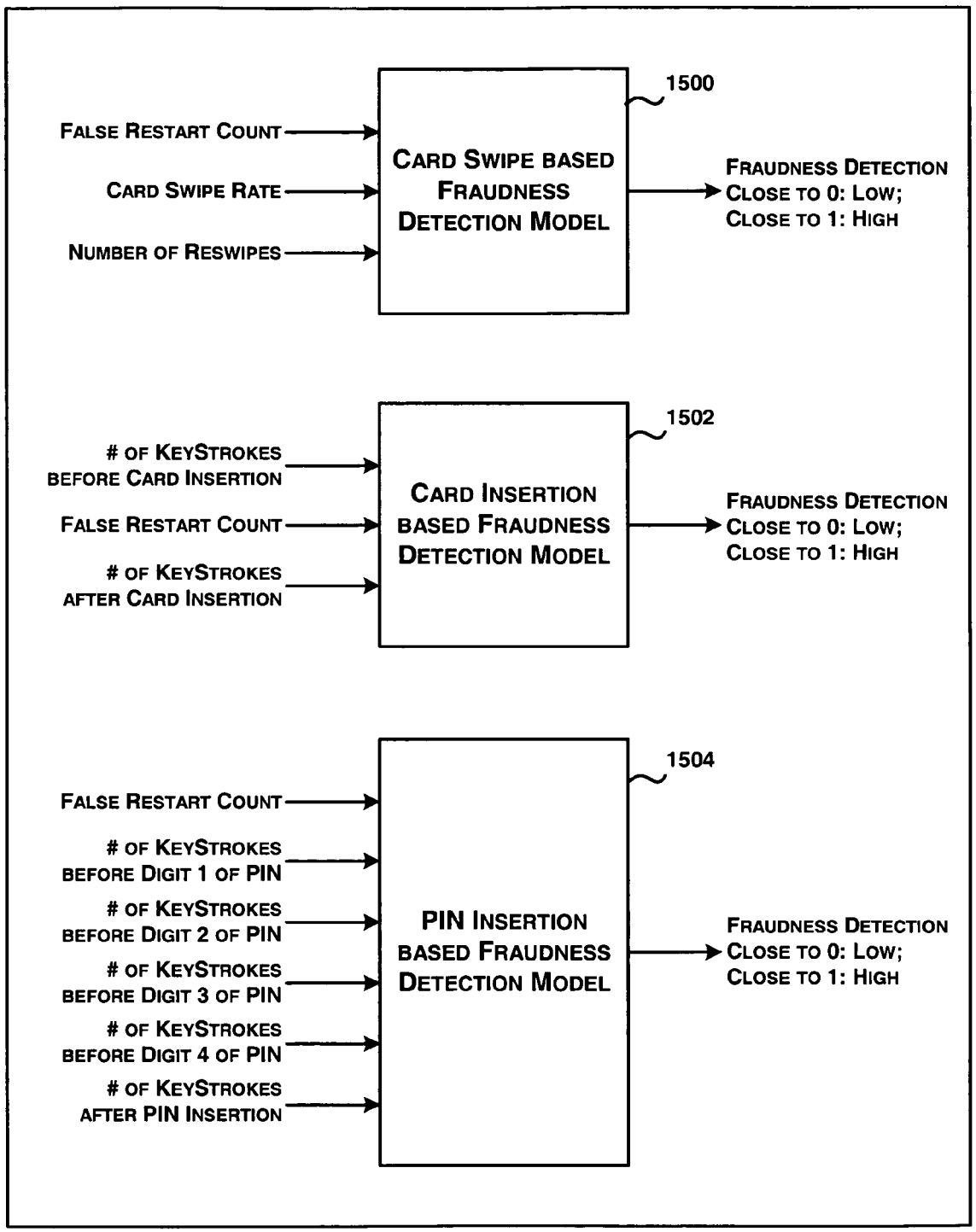
FIG. 15: CARD AND PIN RELATED MODELS

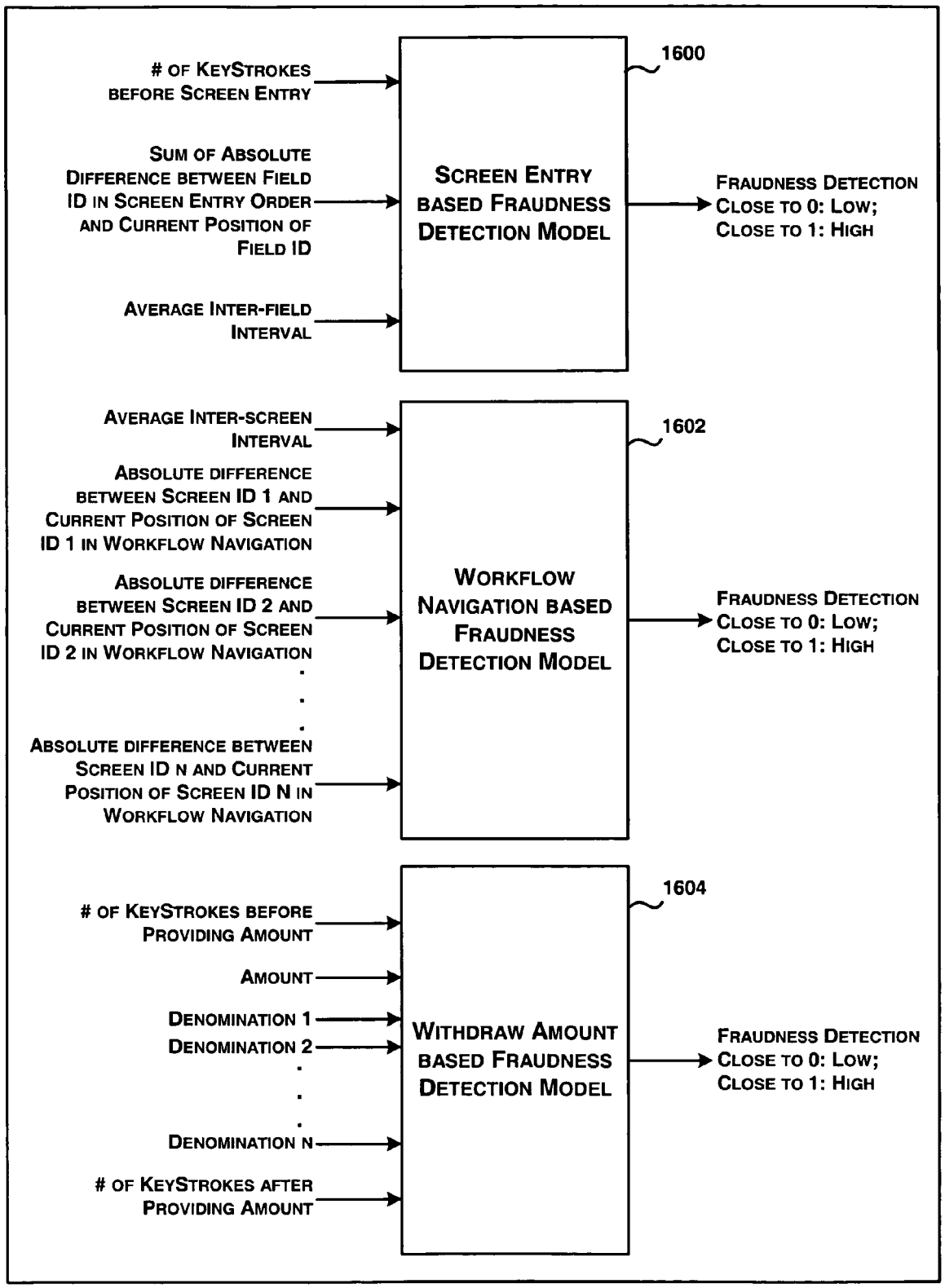
FIG. 16: SCREEN AND WORKFLOW RELATED MODELS

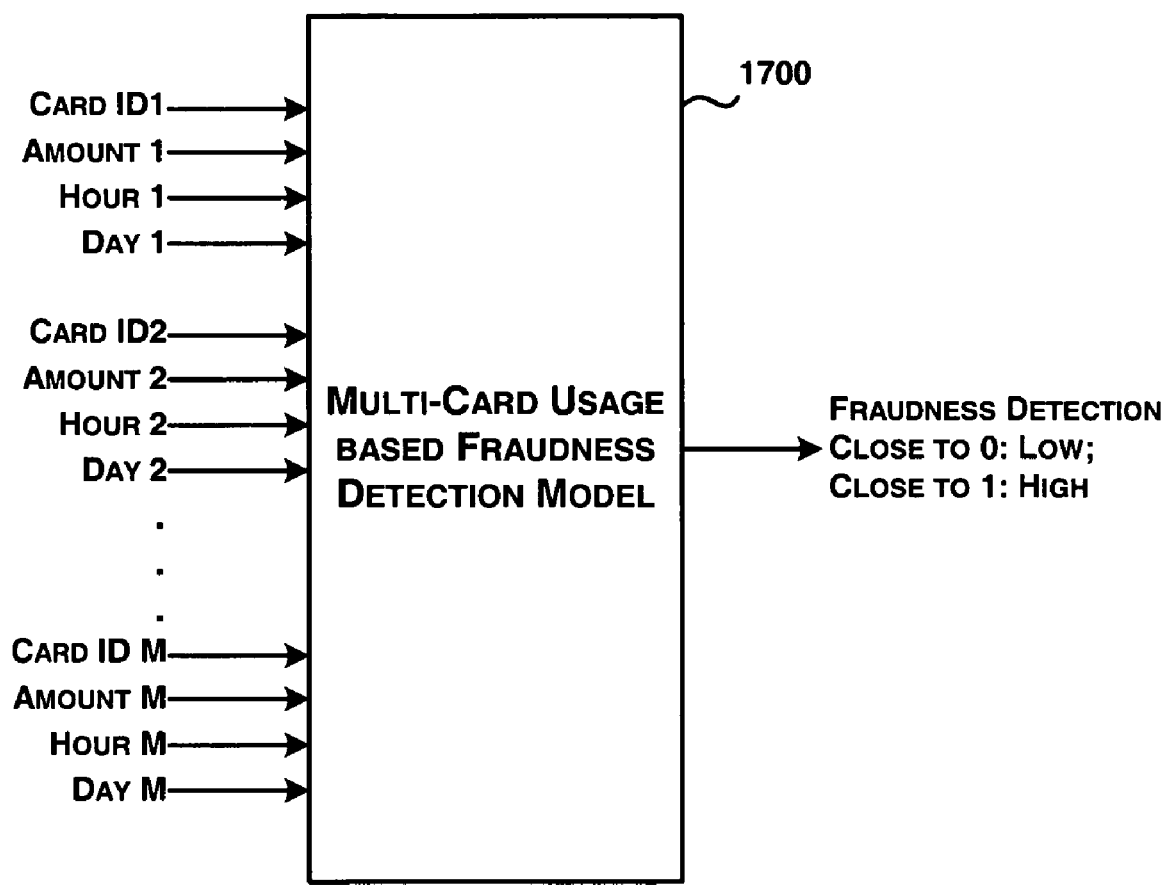
FIG. 17: MULTI-CARD USAGE MODEL

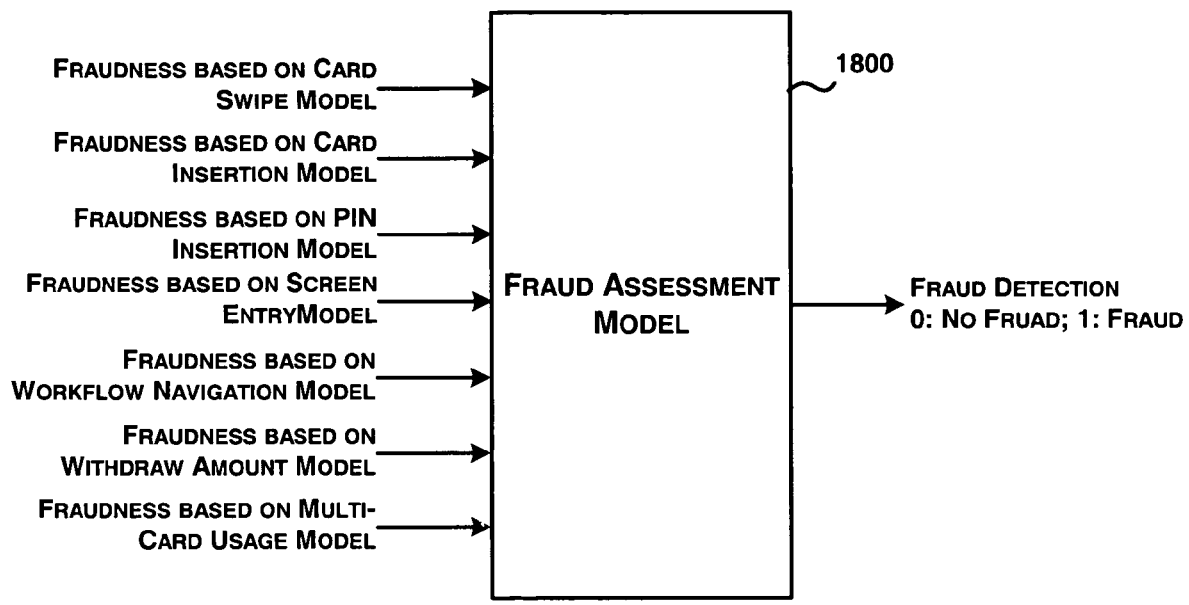
FIG. 18: FRAUD ASSESSMENT MODEL

SYSTEM AND METHOD FOR DEEP INTERACTION MODELING FOR FRAUD DETECTION

FIELD OF THE INVENTION

The present invention relates to the fraud detection in plastic cards based monetary transactions in general, and more particularly, fraud detection during cash card transactions. Still more particularly, the present invention relates to a system and method for deep interaction modeling to determine unique "signature" of users to detect fraudulent transactions.

BACKGROUND OF THE INVENTION

The usage of plastic cards to carry out monetary transactions is on the rise. Each user carries multiple credit and debit cards to be available handily to carry out the purchase of goods at stores, purchase of commodities over Internet, or to obtain cash from ATMs (Automated Teller Machines). While the credit/debit cards are used for a variety of purposes, the main purpose of cash cards is to be able to withdraw cash from ATMs. These cash cards are associated with bank accounts of the users and help withdraw cash without visiting their banks. Typically, users use ATMs to draw cash to pay for the purchased goods or the obtained services. On account of this, there is a distinct behavioral pattern with respect to cash withdrawal demonstrated by the users. This exhibited pattern is both advantageous and disadvantageous: advantageous as normal transactions can get modeled fairly accurately permitting a somewhat easier way of detecting fraudulent transactions and disadvantageous as fraudsters can observe and mimic this behavior somewhat easily as well. While the typical behavior captures most of the transactions of users, there are, however, atypical transactions at irregular intervals leading to difficulties in modeling these transactions. Further, as compared with the credit card transactions that are rich in variety (and, hence are better modeled), the cash card transactions are very flat. There are systems described in the literature that make an attempt to model both typical and atypical cash card transactions. But because of the wide ranging behavior of users, the prediction accuracy and certainty of the transaction based models get limited.

A powerful approach for dealing with ATM frauds is to rely on biometrics based identification techniques. However, some of the issues related to these identification techniques are: (a) integrating with legacy ATMs consumes time, effort, and money; (b) health and hygiene aspects; and (c) operational costs. It is advantageous if it is possible to model the various characteristics of users and use the same in assessing the normality of the input transactions. A robust solution would involve an integrated approach for modeling both user characteristics and user transaction characteristics. While the literature provides ample examples of modeling latter, a system that effectively models the former enhances the system ability to detect fraudulent transactions.

DESCRIPTION OF RELATED ART

U.S. Pat. No. 5,819,226 to Gopinathan; Krishna M. (San Diego, Calif.); Biafore; Louis S. (San Diego, Calif.); Ferguson; William M. (San Diego, Calif.); Lazarus; Michael A. (San Diego, Calif.); Pathria; Anu K. (Oakland, Calif.); and Jost; Allen (San Diego, Calif.) for "Fraud detection using predictive modeling" (issued on Oct. 6, 1998 and assigned to HNC Software Inc. (San Diego, Calif.)) describes an automated system and method for detecting fraudulent transactions that uses a predictive model to model customer accounts and validate customer transactions. Further, the models are redeveloped based on assessed performance of the modes and as more and more transactions get accumulated.

U.S. Pat. No. 5,884,289 to Anderson; Douglas D. (Cape May, N.J.); Anderson; Mary E. (Cape May, N.J.); Urban; Carol Oman (Alexandria, Va.); and Urban; Richard H. (Alexandria, Va.) for "Debit card fraud detection and control system" (issued on Mar. 16, 1999 and assigned to Card Alert Services, Inc. (Arlington, Va.)) describes a system to generate alerts based on the analysis of cardholder debit fraud information provided by financial institution participants. These alerts identify the possible defrauded cardholders and cardholders who are at risk being defrauded.

U.S. Pat. No. 6,516,056 to Justice; Scott C. (Portland, Oreg.); Hopper; Eric L. (Portland, Oreg.); and Obrist; Ken C. (Portland, Oreg.) for "Fraud prevention system and method" (issued on Feb. 4, 2003 and assigned to Vesta Corporation (Portland, Oreg.)) describes a system for identifying one or more fraud indicators and examining transactions based on these fraud indicators to assess whether the transactions are fraudulent.

U.S. Pat. No. 6,736,313 to Dickson; Timothy E. (Greensboro, N.C.) for "Card reader module with pin decryption" (issued on May 18, 2004 and assigned to Gilbarco Inc. (Greensboro, N.C.)) describes a card reader module for decrypting an encrypted PIN to achieve authorization of offline transactions and the system provides additional security while using with smartcards.

U.S. Pat. No. RE38,572 to Tetro; Donald (6401 Rodeo Dr., Fort Lauderdale, Fla. 33330); Lipton; Edward (1600 S. Ocean Dr., Fort Lauderdale, Fla. 33316); and Sackheim; Andrew (11500 SW. 22nd Ct., Davie, Fla. 33024) for "System and method for enhanced fraud detection in automated electronic credit card processing" (issued on Aug. 31, 2004) describes a system for authorizing electronic credit card transactions based on additional measures such as credit card information, address, and social security number to help detect fraudulent transactions.

The known systems do not address the issue of determining a cash card user's unique "signature" and keeping track of the same during the course of life of the cash card. The present invention provides a system for determining and tracking of the various aspects of user interactions and user environment in order to determine fraudulent interactions with ATMs.

SUMMARY OF THE INVENTION

The primary objective of the invention is to determine a cash card user's unique signature and keep track of the same by deep interaction modeling.

One aspect of the present invention is to capture, analyze, and verify a cash card user's interactions.

Another aspect of the present invention is to model a cash card user's card swipe behavior, Card Swipe model, and use the same in fraudness detection.

Yet another aspect of the present invention is to model a cash card user's card insertion behavior, Card Insertion model, and use the same in fraudness detection.

Another aspect of the present invention is to model a cash card user's PIN insertion behavior, PIN Insertion model, and use the same in fraudness detection.

Yet another aspect of the present invention is to model a cash card user's screen interaction behavior, Screen Entry model, and use the same in fraudness detection.

Another aspect of the present invention is to model a cash card user's workflow navigation behavior, Workflow Navigation model, and use the same in fraudness detection.

Yet another aspect of the present invention is to model a cash card user's amount withdrawal behavior and use the same in fraudness detection.

Another aspect of the present invention is to model a cash card user's multi-card usage behavior and use the same in fraudness detection.

Yet another aspect of the present invention is to combine the evaluation results of fraudness detection using card swipe model, fraudness detection using card insertion model, fraudness detection using pin insertion model, fraudness detection using screen entry model, fraudness detection using workflow navigation model, fraudness detection using withdraw amount model, and fraudness detection using multi-card model, to determine whether a transaction is fraudulent or not.

BRIEF DESCRIPTION OF THE DRAWINGS

FIG. 1 depicts the overall system architecture of Deep Interaction Modeling (DIM) System.

FIG. 2 depicts the network architecture of DIM system.

FIG. 3 provides a brief description of the various databases of DIM system.

FIG. 4 describes the relationship between multiple fraudness detectors and fraud assessment.

FIG. 5 provides a typical workflow of DIM system.

FIG. 6 describes the procedure related to Card Swipe model based fraudness detection.

FIG. 7 describes the procedure related to Card Insertion model based fraudness detection.

FIG. 8 describes the procedure related to PIN Insertion model based fraudness detection.

FIG. 9 describes the procedure related to Screen Entry model based fraudness detection.

FIG. 10 describes the procedure related to Workflow Navigation model based fraudness detection.

FIG. 11 describes the procedure related to Withdraw Amount model based fraudness detection.

FIG. 12 describes the procedure related to Multi-Card Usage model based fraudness detection.

FIG. 13 describes the procedure related to Fraud Assessment.

FIG. 14 describes the procedure related to the generation of various fraudness detection models and the fraud assessment model.

FIG. 15 depicts the Card and PIN related fraudness detection models.

FIG. 16 depicts the Screen and Workflow related fraudness detection models.

FIG. 17 depicts the Multi-Card Usage related fraudness detection model.

FIG. 18 depicts the Fraud Assessment model.

DETAILED DESCRIPTION OF THE PREFERRED EMBODIMENTS

FIG. 1 depicts the overall high level architecture of DIM system. Interaction Capture (IC) (100) subsystem runs on an ATM to monitor and collect information about a cash card user's interaction characteristics. IC subsystem collects information related to the way the user (a) swipes or inserts the cash card; (b) types in the PIN; (c) interacts with the ATM using the various screens of the Cash Card application running on the ATM; (d) navigates through the cash card ATM workflow; and (e) inputs the amount along with denomination information. All this information is collected in real time as the user uses the cash card to interact with the ATM and especially, in the case when the money is withdrawn, and is stored in Interactions Database (102). The data gets written onto the database in real time to allow for the verification to be performed even when the user is still interacting with the system. Interaction Analysis (IA) (104) subsystem obtains the interaction information from Interactions Database and uses the same periodically to generate deep interaction models: Card Swipe model, Card Insertion Model, PIN Insertion model, one or more Screen Entry models, Workflow Navigation model, Withdraw Amount model, and Multi-Card Usage model. These generated models are stored in Interaction Models database (106) and are used in real time to assess the fraudness of the current transaction of the user. This is performed by Interaction Verification (IV) (108) subsystem by extracting the required input for the models during the course of the interaction and evaluating the same with respect to the deep interaction models. Specifically, IV subsystem generates six fraudness scores based on Card Swipe/Insertion model, PIN Insertion model, Screen Entry model, Workflow Navigation model, Withdraw Amount model, and Multi-Card Usage model. IA subsystem also generates Fraud Assessment model that combines the fraudness scores of individual models. Fraud assessment (110) uses the Fraud Assessment model to generate the final fraud score for the current transaction.

The main objective of DIM system is to help detect the possible misuses of the cash cards by fraudsters. Each user exhibits a unique interaction characteristic whenever the user interacts with an ATM, and DIM system captures these interactions and verifies the same with respect to the user specific deep interaction models to determine whether there is a cash card misuse. In order to ensure that the characterization of the interactions is unique for a user and hence depicts the user's signature, multiple models are used to capture the user interactions.

FIG. 2 depicts the network architecture of DIM system. Several ATMs (200) are connected via a network (202) to Bank Server (204) and Fraud Server (206). ATMs are used to withdraw cash using cash cards and Bank Server provides authorization, authentication, and accounting of cash card transactions. Fraud Server analyzes the input interactions and provides the computed fraud score of an input transaction to Bank Server.

FIG. 3 provides a brief description of a few important elements of the major databases of DIM system. Card Swipe Info (300) consists information, related to a user swiping a cash card, such as customer id, timestamp of the swipe transaction, number of false restarts, swipe rate, and number of reswipes. Card Insertion Info (302) consists of information, related to a user inserting a cash card, such as customer id, timestamp of the insertion transaction, number of keystrokes before cash card insertion, number of false restarts, and number of keystrokes after cash card insertion. PIN Insertion Info (304) consists of information, related to a user inserting PIN, such as customer id, timestamp, number of false restarts, number of keystrokes before digit 1 of PIN, number of keystrokes before digit 2 of PIN, number of keystrokes before digit 3 of PIN, number of keystrokes before digit 4 of PIN, and number of keystrokes after digit 4 of PIN. Screen Entry Info (306) consists of information, related to a user entering information on a screen of cash card application, such as customer id, timestamp, screen id, number of keystrokes before any field values are entered, sum of absolute difference between field id and current field position in screen entry order for various fields of a screen, and average of elapsed time after entering data in a field and before entering of data in the next field with averaging performed over the various fields of a screen. Workflow Navigation Info (308) consists of information, related to a user navigating through the workflow of a cash card application, such as customer id, timestamp, order values of various screens of the workflow, and average of elapsed time after completing a screen and before entering of next screen with averaging performed over various screens of the workflow. Withdraw Amount Info (310) consists of information, related to the manner in which a user provides amount being withdrawn, such as number of keystrokes before providing amount info, amount, various denominations requested, and number of keystrokes after providing amount info. Multi-Card Usage Info (312) consists of information, related to the usage of multiple cards owned by a user, such as customer id, timestamp, id of card being used, amount being withdrawn, hour of day, and day of week. Card Info (314) consists of information such as customer id, number of cards owned, and list of card ids. Fraud Assessment Info (316) consists of information, related to the combining of fraudness predicted by various models, such as Card Swipe model based fraudness (CSMF), Card Insertion model based fraudness (CIMF), PIN Insertion model based fraudness (PIMF), Screen Entry model based fraudness (SEMF), Workflow Navigation model based fraudness (WNMF), Withdraw Amount model based fraudness (WAMF), Multi-Card Usage model based fraudness (MCUMF), and combined fraud score based on these multiple fraudness values. Model Training Data (318) consists of information, related to the various models, such as customer id, model id, and model training data. Model Info (320) consists of information, related to the various models, such as model id, model description, and model weights.

FIG. 4 provides the relationship between multiple fraudness detectors and the fraud assessment. There are totally seven fraudness detectors: fraudness based on Card Swipe model, fraudness based on Card Insertion model, fraudness based on PIN Insertion model, fraudness based on Screen Entry model, fraudness based on Workflow Navigation model, fraudness based on Withdraw Amount model, and fraudness based on Multi-Card Usage model. The final fraud detection based on Fraud Assessment model is based on the fraudness detected by these seven detectors.

FIG. 5 provides a typical workflow of DIM system. The workflow depicts a scenario involving a user interacting with a Cash Card application to withdraw money. Initially, a check is made to determine whether a cash card is being inserted or swiped and based on this observation, an appropriate model, either Card Swipe model or Card Insertion model, for evaluating the user's characteristic behavior is selected. The required data for evaluating using the selected model is gathered and the fraudness is computed. In the next step, the gathered data is evaluated using one or more Screen Entry models. Specifically, during the course of the interaction using a particular screen, if there is a corresponding Screen Entry model, then the required data is gathered and evaluated for fraudness. On entering of withdraw amount, the necessary data is obtained and Withdraw Amount model is used to evaluate the fraudness. Information collected during workflow navigation is used to assess fraudness based on Workflow Navigation model. Finally, using the gathered data, assess fraudness based on Multi-Card Usage model. Once the seven models have been used to determine fraudness of a transaction, Fraud Assessment model is used to compute the fraud score of the transaction. Observe that in order to block the ongoing transaction, if the fraudness detected by any of the seven models is sufficiently high, an abort message is sent to facilitate the blocking of the transaction.

FIG. 6 describes the procedure related to Card Swipe model based fraudness detection. On receiving card swipe initiation message (600), set false restart count to 0. Identify the leading card edge (602) and increment false restarts count (604). Identify the trailing card edge (606) and determine the card swipe rate (608). Obtain the number of card reswipes (610). Get last transaction date and time (612) from the database and compare that with the information in the card. Take an appropriate action if there is a mismatch. Determine Card Swipe model parameters (614) and update card and database (616). Card is updated with last transaction date and time, and database is updated with transaction information and model parameters. Use Card Swipe model to assess the fraudness of the transaction and compute CSMF score (618). Compare CSMF score with a threshold value (620). If the score is greater than the upper threshold, send fraud transaction abort message (622).

FIG. 7 describes the procedure related to Card Insertion model based fraudness detection. On receiving card inserted message (700), determine the number of keystrokes before card insertion (702). Count the number of false restarts (704) wherein the card was not inserted properly. Determine the number of keystrokes after card insertion (706). Get last transaction date and time (708) from the database and compare that with the information in the card. Take an appropriate action if there is a mismatch. Determine Card Insertion model parameters (710) and update card and database (712). Card is updated with last transaction date and time, and database is updated with transaction information and model parameters. Use Card Insertion model to assess the fraudness of the transaction and compute CIMF score (714). Compare CIMF score with a threshold value (716). If the score is greater than the upper threshold, send fraud transaction abort message (718).

FIG. 8 describes the procedure related to PIN Insertion model based fraudness detection. On displaying PIN entry screen (800), count the number of false restarts (802). Track the keystrokes as they are typed in including special keys such as backspace before entering digit 1 of PIN (804) and compute the number of keystrokes (806). Track the keystrokes as they are typed in including special keys such as backspace before entering digit 2 of PIN (808) and compute the number of keystrokes (810). Track the keystrokes as they are typed in including special keys such as backspace before entering digit 3 of PIN (812) and compute the number of keystrokes (814). Track the keystrokes as they are typed in including special keys such as backspace before entering digit 4 of PIN (816) and compute the number of keystrokes (818). Track the keystrokes as they are typed in including special keys such as backspace after entering digit 4 of PIN (820) and compute the number of keystrokes (822). Determine PIN Insertion model parameters (824) and update database (826). Database is updated with transaction information and model parameters. Use PIN Insertion model to assess the fraudness of the transaction and compute PIMF score (828). Compare PIMF score with a threshold value (830). If the score is greater than the upper threshold, send fraud transaction abort message (832).

FIG. 9 describes the procedure related to Screen Entry model based fraudness detection. On entering into a particular screen of Cash Card application (900), check whether that particular screen has been modeled (902). If so, determine the appropriate Screen Entry model (904). Determine the number of keystrokes before screen entry (906). Determine the order in which the various fields are entered and compute Fields Order Value (908). One of the ways to compute this for a screen is to compute the sum of absolute difference between a field id in screen entry order and current position of the field id, with summing carried out over the various fields of the screen. Compute the average inter-field interval by computing the elapsed time in moving from one field to another in a screen (910). Determine Screen Entry model parameters (912) and update database (914). Database is updated with transaction information and model parameters. Use Screen Entry model to assess the fraudness of the transaction and compute SEMF score (916). Compare SEMF score with a threshold value (918). If the score is greater than the upper threshold, send fraud transaction abort message (920).

FIG. 10 describes the procedure related to Workflow Navigation model based fraudness detection. On receiving user interaction message (1000), track the navigation within a workflow (1002). Determine the flow within the workflow and compute the time spent at each node of the workflow (1004). For each screen that represents a node in the workflow, determine the absolute difference between the screen ID and its position in the current navigation (1006). Compute average inter-screen interval (1008). Determine Workflow Navigation model parameters (1010) and update database (1012). Database is updated with transaction information and model parameters. Use Workflow Navigation model to assess the fraudness of the transaction and compute WNMF score (1014). Compare WNMF score with a threshold value (1016). If the score is greater than the upper threshold, send fraud transaction abort message (1018).

FIG. 11 describes the procedure related to Withdraw Amount model based fraudness detection. On entering withdrawal amount screen (1100), determine the number of keystrokes before providing amount (1102). Determine the keyed in amount and the requested denominations (1104). Determine the number of keystrokes after providing the amount (1106). Determine Withdraw Amount model parameters (1108) and update database (1110). Database is updated with transaction information and model parameters. Use Withdraw Amount model to assess the fraudness of the transaction and compute WAMF score (1112). Compare WAMF score with a threshold value (1114). If the score is greater than the upper threshold, send fraud transaction abort message (1116).

FIG. 12 describes the procedure related to Multi-Card Usage model based fraudness detection. On selection of withdrawal option and entering of amount (1200), obtain amount (1202). Determine Multi-Card Usage model parameters (1204) and update database (1206). Database is updated with transaction information and model parameters. Note that Multi-Card Usage model is based on the last M transaction details involving the use of the various cards owned by a user and is applicable even in those cases where only one card is owned. Use Multi-Card Usage model to assess the fraudness of the transaction and compute MCUMF score (1208). Compare MCUMF score with a threshold value (1210). If the score is greater than the upper threshold, send fraud transaction abort message (1212).

FIG. 13 describes the procedure related to Fraud Assessment. Obtain evaluation by various fraudness detection models (1300). Determine Fraud Assessment model parameters (1302) and update database (1304). Database is updated with model parameters. Use Fraud Assessment model to assess the fraudness of the transaction and compute FA score (1306). Compare FA score with a threshold value (1308). If the score is greater than the upper threshold, send fraud transaction abort message (1310).

FIG. 14 describes the procedure related to the generation of various fraudness detection models and the fraud assessment model. For each fraudness detection models and the fraud assessment model (1400), obtain model training data from the database (1402). Note that model training database contains, for various model specific information, the corresponding fraudness assessment (in case of fraudness detection models) and fraud assessment (in case of fraud assessment model). Train the corresponding neural network model (1404) and update model database with model weights (1406).

FIG. 15 depicts the Card and PIN related fraudness detection models. Card Swipe model (1500) is based on three parameters: False Restart Count, Card Swipe Rate, and Number of Reswipes, and its output is an indication of fraudness of a transaction: a value close to 0 depicts fraudness being low while a value close to 1 depicts fraudness being high. Card Insertion model (1502) is based on three parameters: Number of keystrokes before card insertion, False Restart Count, and Number of keystrokes after card insertion, and its output is an indication of fraudness of a transaction: a value close to 0 depicts fraudness being low while a value close to 1 depicts fraudness being high. PIN insertion model (1504) six parameters: False Restart Count, Number of keystrokes before digit 1 of PIN is entered, Number of keystrokes before digit 2 of PIN is entered, Number of keystrokes before digit 3 of PIN is entered, Number of keystrokes before digit 4 of PIN is entered, and Number of keystrokes after PIN is entered, and its output is an indication of fraudness of a transaction: a value close to 0 depicts fraudness being low while a value close to 1 depicts fraudness being high.

FIG. 16 depicts the Screen and Workflow related fraudness detection models. Screen Entry model (1600) is based on three parameters: Number of keystrokes before screen entry, Sum of absolute difference between a field id in screen entry order and current position of the field id, with summing carried out over the various fields of the screen, and Average inter-field interval, and its output is an indication of fraudness of a transaction: a value close to 0 depicts fraudness being low while a value close to 1 depicts fraudness being high. Average inter-field interval is computed by computing the elapsed time in moving from one field to another in a screen. Workflow Navigation model (1602) is based on N+1 parameters, wherein N is the number of screens in a cash card application workflow: Average inter-screen interval, absolute difference between a screen id and its position in the current navigation for each of the N screens, and its output is an indication of fraudness of a transaction: a value close to 0 depicts fraudness being low while a value close to 1 depicts fraudness being high. Withdraw Amount model (1604) is based on N+3 parameters, wherein N is the number of possible denominations: Number of keystrokes before providing amount, Amount, N denominations, and Number of keystrokes after providing amount, and its output is an indication of fraudness of a transaction: a value close to 0 depicts fraudness being low while a value close to 1 depicts fraudness being high.

FIG. 17 depicts the Multi-Card Usage model. The model (1700) is based on 4M parameters, wherein M is the number of recent past transactions considered to assess the fraudness of the current transaction: each card usage results in four values, namely, Card id, Amount, Hour of day based on transaction timestamp, Day of week based on transaction timestamp, and its output is an indication of fraudness of a transaction: a value close to 0 depicts fraudness being low while a value close to 1 depicts fraudness being high.

FIG. 18 depicts the Fraud Assessment model. The model (1800) is based on 7+parameters, wherein anything in excess of 7 is due to the provisioning of multiple screen entry models: Fraudness based on Card Swipe model, Fraudness based on Card Insertion model, Fraudness based on PIN insertion model, Fraudness based on Screen Entry model(s), Fraudness based on Workflow Navigation model, Fraudness based on Withdraw Amount model, and Fraudness based on Multi-Card Usage model, and its output is an indication of whether a transaction is fraudulent or not: a value equal to 0 depicts that the transaction is not a fraudulent transaction while a value equal to 1 depicts that the transaction is a fraudulent transaction.

Thus, a system and method for deep interaction modeling for fraud detection is disclosed. Although the present invention has been described particularly with reference to the figures, it will be apparent to one of the ordinary skill in the art that the present invention may appear in any number of systems that perform interaction modeling. It is further contemplated that many changes and modifications may be made by one of ordinary skill in the art without departing from the spirit and scope of the present invention.

What is claimed is:

1. A deep interaction modeling, DIM, system for fraud detection, said system comprising:
  (a) Interaction Capture, IC, subsystem for capturing and storing user interactions comprising:
    a Card Swipe operation Capture, CSC, element for capturing a plurality of user interactions during card swipe operation;
    a Card Insertion operation Capture, CIC, element for capturing a plurality of user interactions during card insertion operation;
    a PIN Insertion operation Capture, PIC, element for capturing a plurality of user interactions during PIN insertion operation;
    a Screen Entry operation Capture, SEC, element for capturing a plurality of user interactions during screen entry operations;
    a Workflow Navigation operation Capture, WNC, element for capturing a plurality of user interactions during workflow navigation operation;
    a Withdraw Amount Capture, WAC, element for capturing a plurality of user interactions during amount withdraw operation; and
    a Multi-Card Usage Capture, MCUC, element for capturing a plurality of user interactions during usage of a cash card;
  (b) Interaction Analysis, IA, subsystem for analyzing and storing of captured user interactions comprising:
    a Card Swipe Model, CSM, element for determining Card Swipe model weights;
    a Card Insertion Model, CIM, element for determining Card Insertion model weights;
    a PIN Insertion Model, PIM, element for determining PIN Insertion model weights;
    a Screen Entry Model, SEM, element for determining Screen Entry model weights;
    a Workflow Navigation Model, WNM, element for determining Workflow Navigation model weights;
    a Withdraw Amount Model, WAM, element for determining Withdraw Amount model weights;
    a Multi-Card Usage Model, MCUM, element for determining Multi-Card Usage model weights; and
    a Fraud Assessment Model, FAM, element for determining Fraud Assessment model weights; and
  (c) Interaction Verification, IV, subsystem for verifying captured user interactions comprising:
    a Card Swipe Model based Fraudness Detection, CSMFD, element for determining fraudness of a transaction based on Card Swipe model;
    a Card Insertion Model based Fraudness Detection, CIMFD, element for determining fraudness of a transaction based on Card Insertion model;
    a PIN Insertion Model based Fraudness Detection, PIMFD, element for determining fraudness of a transaction based on PIN Insertion model;
    a Screen Entry Model based Fraudness Detection, SEMFD, element for determining fraudness of a transaction based on Screen Entry model;
    a Workflow Navigation Model based Fraudness Detection, WNMFD, element for determining fraudness of a transaction based on Workflow Navigation model;
    a Withdraw Amount Model based Fraudness Detection, WAMFD, element for determining fraudness of a transaction based on Withdraw Amount model;
    a Multi-Card Usage Model based Fraudness Detection, MCUMFD, element for determining fraudness of a transaction based on Multi-Card Usage model; and
    a Fraud Assessment Model based Fraudness Detection, FAMFD, element for determining whether a transaction is fraudulent or not based on Fraud Assessment model.

2. The system of claim 1, wherein said CSC element comprises a procedure to capture a plurality of user interactions comprising: false restart count, card swipe rate, and number of reswipes.

3. The system of claim 1, wherein said CIC element comprises a procedure to capture a plurality of user interactions comprising: number of keystrokes before card insertion, false restart count, and number of keystrokes after card insertion.

4. The system of claim 1, wherein said PIC element comprises a procedure to capture a plurality of user interactions comprising: false restart count, number of keystrokes before entering digit 1 of PIN, number of keystrokes before entering digit 2 of PIN, number of keystrokes before entering digit 3 of PIN, number of keystrokes before entering digit 4 of PIN, and number of keystrokes after entering PIN.

5. The system of claim 1, wherein said SEC element comprises a procedure to capture a plurality of user interactions, with respect to a screen comprising of a plurality of fields, comprising: number of keystrokes before screen entry, sum of absolute difference between a field id of said plurality of fields and current position of said field id for each field id of said plurality of fields, and average inter-field interval.

6. The system of claim 1, wherein said WNC element comprises a procedure to capture a plurality of user interactions, with respect to a workflow comprising of a plurality of screens, comprising: average inter-screen interval, and sum of absolute difference between screen id of a screen of said plurality of screens and current position of said screen for each screen of said plurality of screens.

7. The system of claim 1, wherein said WAC element comprises a procedure to capture a plurality of user interactions comprising: number of keystrokes before providing amount, amount, a plurality of denominations, and number of keystrokes after providing amount.

8. The system of claim 1, wherein said MCUC element comprises a procedure to capture a plurality of user interactions during a withdraw transaction comprising: card id of said withdraw transaction, amount of said withdraw transaction, hour of day of said withdraw transaction, and time of day of said withdraw transaction.

9. The system of claim 1, wherein said CSM element comprises a procedure to obtain a training data set, comprising: false restart count, card swipe rate, number of reswipes, and fraudness score, related to Card Swipe model, and derive a neural network based Card Swipe model based on said training data set.

10. The system of claim 1, wherein said CIM element comprises a procedure to obtain a training data set, comprising: number of keystrokes before card insertion, false restart count, number of keystrokes after card insertion, and fraudness score, related to Card Insertion model, and derive a neural network based Card Insertion model based on said training data set.

11. The system of claim 1, wherein said PIM element comprises a procedure to obtain a training data set, comprising: false restart count, number of keystrokes before entering digit 1 of PIN, number of keystrokes before entering digit 2 of PIN, number of keystrokes before entering digit 3 of PIN, number of keystrokes before entering digit 4 of PIN, number of keystrokes after entering PIN, and fraudness score, related to PIN Insertion model, and derive a neural network based PIN Insertion model based on said training data set.

12. The system of claim 1, wherein said SEM element comprises a procedure to obtain a training data set, with respect to a screen comprising of a plurality of fields, comprising: number of keystrokes before screen entry, sum of absolute difference between a field id of said plurality of fields and current position of said field id for each field id of said plurality of fields, average inter-field interval, and fraudness score, related to Screen Entry model, and derive a neural network based Screen Entry model based on said training data set.

13. The system of claim 1, wherein said WNM element comprises a procedure to obtain a training data set, with respect to a workflow comprising of a plurality of screens, comprising: average inter-screen interval, absolute difference between screen id of a screen of said plurality of screens and current position of said screen for each screen of said plurality of screens, and fraudness score, related to Workflow Navigation model, and derive a neural network based Workflow Navigation model based on said training data set.

14. The system of claim 1, wherein said WAM element comprises a procedure to obtain a training data set, comprising: number of keystrokes before providing amount, amount, a plurality of denominations, number of keystrokes after providing amount, and fraudness score, related to Withdraw Amount model, and derive a neural network based Withdraw Amount model based on said training data set.

15. The system of claim 1, wherein said MCUM element comprises a procedure to obtain a training data set, comprising: card id, amount, hour, day, and fraudness score of a predefined number of cash card transactions, related to Multi-Card Usage model, and derive a neural network based Multi-Card Usage model based on said training data set.

16. The system of claim 1, wherein said FAM element comprises a procedure to obtain a training data set, comprising: fraudness based on Card Swipe model, fraudness based on Card Insertion model, fraudness based on PIN Insertion model, Fraudness based on Screen Entry model, fraudness based on Workflow Navigation model, fraudness based on Withdraw Amount model, and fraudness based on Multi-Card Usage model, and fraud score, related to Fraud Assessment model, and derive a neural network based Fraud Assessment model based on said training data set.

17. The system of claim 1, wherein said CSMFD element comprises a procedure to verify said transaction for fraudness by computing a fraudness score based on Card Swipe model and comparing said fraudness score against a predefined threshold value.

18. The system of claim 1, wherein said CIMFD element comprises a procedure to verify said transaction for fraudness by computing a fraudness score based on Card Insertion model and comparing said fraudness score against a predefined threshold value.

19. The system of claim 1, wherein said PIMFD element comprises a procedure to verify said transaction for fraudness by computing a fraudness score based on PIN Insertion model and comparing said fraudness score against a predefined threshold value.

20. The system of claim 1, wherein said SEMFD element comprises a procedure to verify said transaction for fraudness by computing a fraudness score based on Screen Entry model and comparing said fraudness score against a predefined threshold value.

21. The system of claim 1, wherein said WNMFD element comprises a procedure to verify said transaction for fraudness by computing a fraudness score based on Workflow Navigation model and comparing said fraudness score against a predefined threshold value.

22. The system of claim 1, wherein said WAMFD element comprises a procedure to verify said transaction for fraudness by computing a fraudness score based on Withdraw Amount model and comparing said fraudness score against a predefined threshold value.

23. The system of claim 1, wherein said MCUMFD element comprises a procedure to verify said transaction for fraudness by computing a fraudness score based on Multi-Card Usage model and comparing said fraudness score against a predefined threshold value.

24. The system of claim 1, wherein said FAMFD element comprises a procedure to verify whether said transaction is fraudulent or not by computing a fraud score based on Fraud Assessment model and comparing said fraud score against a predefined threshold value.

* * * * *